United States Patent
Gupta et al.

(10) Patent No.: US 10,464,212 B2
(45) Date of Patent: Nov. 5, 2019

(54) METHOD AND SYSTEM FOR TELE-OPERATED INVENTORY MANAGEMENT SYSTEM

(71) Applicant: Amazon Technologies, Inc., Seattle, WA (US)

(72) Inventors: Bhaskar Gupta, Seattle, WA (US); Martin Peter Aalund, Seattle, WA (US); Jeetendra G. Mirchandani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/471,944

(22) Filed: Mar. 28, 2017

(65) Prior Publication Data

US 2018/0284760 A1    Oct. 4, 2018

(51) Int. Cl.
*G05D 1/00* (2006.01)
*B25J 9/16* (2006.01)
(Continued)

(52) U.S. Cl.
CPC .......... *B25J 9/1689* (2013.01); *B25J 13/006* (2013.01); *B25J 13/065* (2013.01); *B65G 1/0492* (2013.01); *B65G 1/137* (2013.01); *G05D 1/0016* (2013.01); *G05D 1/0022* (2013.01); *G06F 3/011* (2013.01); *G06F 3/016* (2013.01); *G06F 21/121* (2013.01); *G06Q 10/08* (2013.01); *H04N 5/44504* (2013.01); *B65G 1/1373* (2013.01);
(Continued)

(58) Field of Classification Search
CPC ......... G05B 2219/40153; G05D 1/0016; B25J 9/1689
See application file for complete search history.

(56) References Cited

U.S. PATENT DOCUMENTS 7,912,574 B2    3/2011    Wurman et al.
7,991,885 B2 *  8/2011    Ando .................... G08C 17/00
                                                      700/245
(Continued)

FOREIGN PATENT DOCUMENTS

WO    2014089316 A1    6/2014

OTHER PUBLICATIONS

U.S. Appl. No. 15/384,139, U.S. Patent Application, filed Dec. 19, 2016, Titled: Robot Implemented Item Manipulation.
(Continued)

*Primary Examiner* — Thomas Randazzo
(74) *Attorney, Agent, or Firm* — Kilpatrick Townsend & Stockton LLP

(57) ABSTRACT

Described herein is an inventory management system, and corresponding methods, in which robotic units are configured to execute at least a portion of a set of instructions in an automated manner. During execution of the set of instructions, robotic units may encounter tasks that they are unable to complete in an automated manner. The robotic units, upon encountering these tasks, may submit a request for manual operation to a control unit. In some embodiments, the request may be assigned to an available operator, which may take over control of the robotic unit using a remote manipulation device, to complete the task manually. Once the task has been completed manually, automated execution of the instructions may be resumed.

20 Claims, 10 Drawing Sheets

(51) Int. Cl.
*B25J 13/00* (2006.01)
*B65G 1/137* (2006.01)
*B65G 1/04* (2006.01)
*B25J 13/06* (2006.01)
*H04N 5/445* (2011.01)
*G06F 3/01* (2006.01)
*G06F 21/12* (2013.01)
*G06Q 10/08* (2012.01)

(52) U.S. Cl.
CPC .............. *G05B 2219/39212* (2013.01); *G05B 2219/40153* (2013.01); *G05D 2201/0216* (2013.01)

(56) References Cited

U.S. PATENT DOCUMENTS

| | | | | |
|---|---|---|---|---|
| 9,020,679 | B2* | 4/2015 | Zini | G05B 19/41895 |
| | | | | 701/23 |
| 9,085,080 | B2* | 7/2015 | Mian | B25J 9/16 |
| 9,128,476 | B2* | 9/2015 | Jung | G05B 19/0426 |
| 9,486,921 | B1* | 11/2016 | Straszheim | B25J 9/1679 |
| 9,623,562 | B1* | 4/2017 | Watts | B25J 9/1689 |
| 9,802,317 | B1* | 10/2017 | Watts | B25J 9/1687 |
| 2011/0178619 | A1* | 7/2011 | Jung | G05B 19/0426 |
| | | | | 700/95 |
| 2014/0163730 | A1* | 6/2014 | Mian | B25J 9/16 |
| | | | | 700/248 |
| 2015/0360865 | A1* | 12/2015 | Massey | B65G 1/1373 |
| | | | | 414/275 |
| 2017/0036347 | A1* | 2/2017 | Bonin | B25J 9/1676 |
| 2017/0057083 | A1* | 3/2017 | Maeda | B25J 9/161 |
| 2017/0305014 | A1* | 10/2017 | Gildert | B25J 9/1664 |
| 2017/0320210 | A1* | 11/2017 | Ding | B25J 9/163 |

OTHER PUBLICATIONS

Kaipa et al., "Enhancing Robotic Unstructured Bin-picking Performance by Enabling Remote Human Interventions in Challenging Perception Scenarios", IEEE International Conference on Automation Science and Engineering (Case), IEEE, Aug. 21, 2016, pp. 639-645.

PCT/US2018/023415 , "International Search Report and Written Opinion", dated Jun. 15, 2018, 16 pages.

Sellner et al., "Coordinated Multiagent Teams and Sliding Autonomy for Large-Scale Assembly", Proceedings of the IEEE, vol. 94, No. 7, Jul. 1, 2006, pp. 1425-1444.

* cited by examiner

METHOD AND SYSTEM FOR TELE-OPERATED INVENTORY MANAGEMENT SYSTEM

BACKGROUND

Modern inventory systems, such as those in mail order warehouses, supply chain distribution centers, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to an inventory management system in which one or more robotic units are configured to carry out tasks automatically. In some embodiments, robotic units, during an automated execution of a set of instructions, may submit a request to a control unit for manual operation. The request may be assigned to an operator (e.g., a user having access to a remote manipulation device), which may take over functions of the robotic unit and manually cause the robotic unit to perform an operation. Once the request for manual operation has been completed, the robotic unit may continue with its automated execution of the set of instructions. For the purposes of this disclosure, the term automated or automatic may infer a lack of human interaction.

For example, in the described system, the robotic units may, during execution of an automated procedure, encounter tasks that the robotic units are unable to perform automatically (e.g., the system may have insufficient instructions for performing the task). In this scenario, the robotic units of the described system may submit a request for manual operation to a queue of operators to complete the task. When the request reaches the top of the queue, and when an operator is available to handle the request, the operator is able to take control of the robotic unit to complete the task manually. The operator may be shown image information related to a position of an end-of-arm tool and/or an item during manual operation of the robotic unit. Once the task has been completed, the operator may be assigned the next manual operation request in the queue. Within the described inventory management system, a number of robotic units may be performing automated tasks, such that a number of robotic units may require assistance at any given time. In this way, operators are directed to only those robotic units that need immediate assistance, which minimizes downtime for the operator (e.g., by minimizing the need to wait while a robotic unit traverses to a particular location) and maximizes the number of tasks that may be performed by a single operator.

Figure 1:
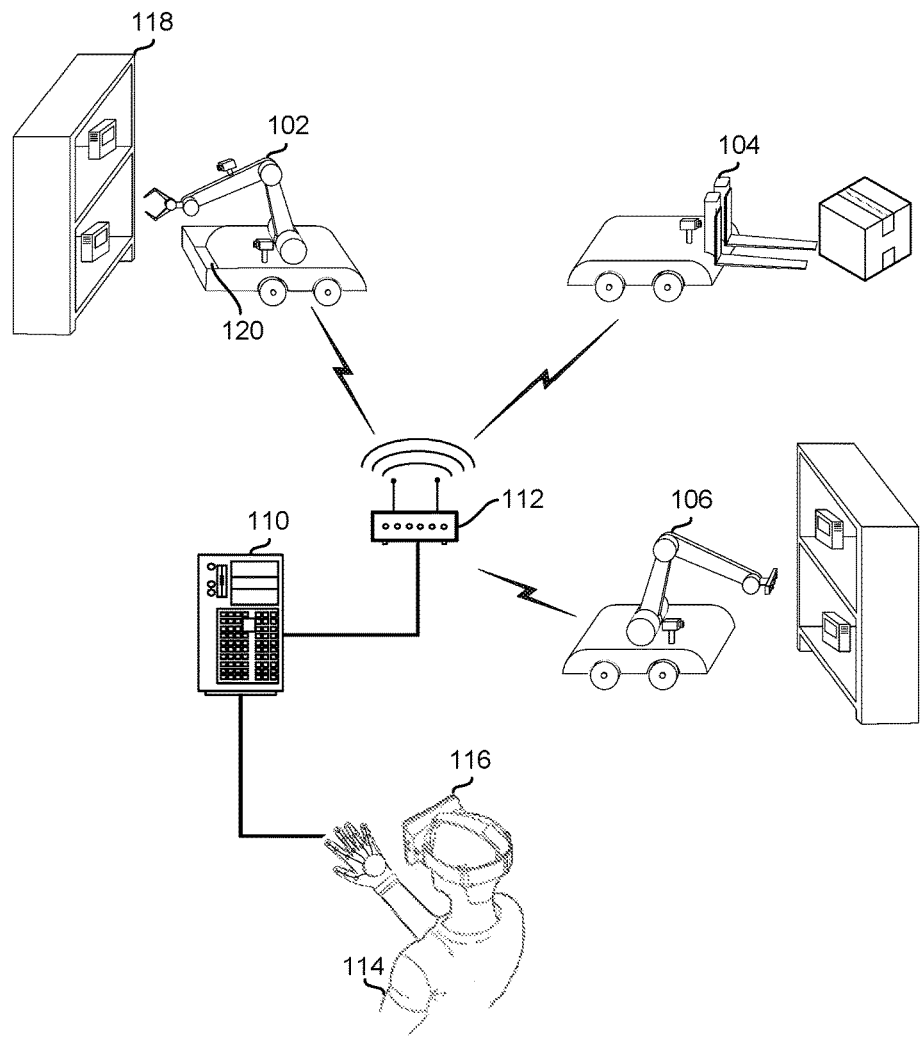
FIG. 1 depicts an illustrative example of an inventory management system in which robotic units are operated in accordance with embodiments of the disclosure.

FIG. 1 depicts an illustrative example of an inventory management system in which robotic units are operated in accordance with embodiments of the disclosure. In some embodiments, a number of robotic units 102, 104, and 106 may be in communication with a control unit 110. Communication between the robotic units and the control unit 110 may be established via any suitable communication mechanism. In some embodiments, communication may be established via a wireless local area network using a wireless router 112.

In accordance with some embodiments, each robotic unit within the inventory management system may be provided, by the control unit 110, with a set of instructions to cause that robotic unit to at least partially execute a task in an automated manner (e.g., without user interaction). The provided instructions may also cause the robotic unit to hand over control of the robotic unit to an operator 114 for execution of a portion of the task. During execution of this portion of the task, the user may control the robotic unit via a remote manipulation device 116. Once the manual portion of the task has been completed by the operator, the robotic unit may be caused to continue with automated tasks.

The remote manipulation device 116 may be any electronic device capable of transmitting input received from an operator to a robotic unit 102. In some embodiments, the remote manipulation device 116 may be configured to receive and relay data received from the robotic unit. For example, the remote manipulation device 116 may include a display device capable of presenting image data received from the robotic unit 102 (e.g., video image data). In some embodiments, the remote manipulation device 116 may provide feedback to a user in a variety of ways. For example, the remote manipulation device 116 may provide haptic feedback to a user by generating vibrations in order to relay information related to input received from the robotic unit 102. In some embodiments, the remote manipulation device may be a combination of devices. For example, the remote manipulation device may be a virtual reality (VR) headset capable of receiving image information (e.g., video augmented with a text overlay) and a pair of sensor gloves capable of receiving hand motion information as user input and translating that user input to computer-executable instructions. In another example, the remote manipulation device may include a display device and a joystick. In another example, a remote manipulation device may include a combination of a VR headset and one or more gloves that are tracked by a system in communication with the VR headset (e.g., using machine vision via a camera system or using sensors on the one or more gloves). In this example, the operator may be provided the ability to guide the robot by moving his or her hand in a projected virtual space.

By way of illustrative example, a robotic unit 102 may be a robotic picking unit, which is designed to retrieve and/or stow inventory items in storage locations of the inventory management system. In this system, the robotic unit 102 may receive instructions to fulfill at least part of an order submitted to the inventory management system by retrieving one or more items from storage bin 118. In this example, the robotic unit 102 may automatically traverse to the location of storage bin 118 (e.g., using routing software) and position itself in front of the item. The robotic unit 102 may then submit a request to the control unit 110 for manual manipulation of the requested item. The control unit 110 may add the request to a queue of such requests that are being worked on by one or more operators. Once the request is at the top of the queue and is selected by or assigned to an operator 114, the operator 114 may use the remote manipulation device 116 to control the robotic unit 102 and to cause it to pick the requested item. The operator 114 may then cause the robotic unit 102 to deposit the item into a bin 120, cart, shipping container, or other suitable placement location. Once the operator 114 indicates that his portion of the task has been completed, the robotic unit 102 may be caused to resume automated functions by traversing to the next location.

In some embodiments, each time that the robotic unit 102 relinquishes control to an operator 114, the control unit 110 may record operations performed by the operator 114. In some embodiments, the control unit 110 may use this recorded information along with one or more machine learning techniques to identify patterns for manipulating particular items. For example, the control unit 110 may record operations performed by a number of operators with respect to a particular item or type of item. Based on these recorded operations, the control unit 110 may identify an appropriate set of instructions for manipulating the particular item. In some embodiments, a set of instructions may be particular to a specific pose or position of the item. In future cases in which the robotic unit 102 is tasked with retrieving the particular item, the retrieval of the item may be entirely automated, as the robotic unit 102 may be caused to perform the learned set of instructions to manipulate the item. In some cases, the robotic unit 102 may attempt to manipulate the item, and may subsequently submit a request for an operator upon failure to properly manipulate the item. For example, if the robotic unit 102 approaches the storage location 118 and determines that the item is not positioned properly (e.g., using machine vision techniques), the robotic unit 102 may determine that the set of instructions is no longer relevant to retrieval of the item and may subsequently request operator 114 support. In some embodiments, the actions recorded with respect to a number of operators may be used to train new operators in grasping an item. For example, new operators may be provided an instructional video for grasping an object recorded from a previous manual operation.

In some embodiments, the inventory management system may receive feedback with respect to performed manual operations. For example, the inventory management system may receive feedback from a quality assurance (QA) unit that indicates a status of the item with respect to the performed manual operations. In this example, the QA unit may determine that the item was broken or otherwise damaged. In some embodiments, an operator may augment image information to assist the robotic unit. For example, an operator may highlight a representation of an item within an image in order to help the robotic unit locate the item. Based on this analysis, the system may learn that the actions recorded with respect to the manual operation used to manipulate the item are inappropriate. In some embodiments, the inventory management system may generate instructions for manipulating an item (e.g., retrieving the item from a storage location) based on the manual operations most commonly performed by operators. Some examples of ways in which an inventory management system may be trained to manipulate items based on human feedback are provided in U.S. patent application Ser. No. 15/384,139, filed Dec. 19, 2016, entitled "Robot Implemented Item Manipulation," which is herein incorporated by reference in its entirety.

It should be noted that a manual operation may be any suitable operation requiring manual user intervention. For example, in addition to picking and/or stowing of items, a manual operation may include performing quality assurance (QA), bin counting, physical—virtual inventory verification, or any other suitable action. In some embodiments, the manual operation may include setting up the robotic unit to perform a task in an automated fashion. For example, the manual operation may cause an operator to view the current status of the task and provide instructions to the robotic unit (e.g., a type of grasp to use, an amount of force to use in the grasp, or a pose to initiate the grasp from).

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
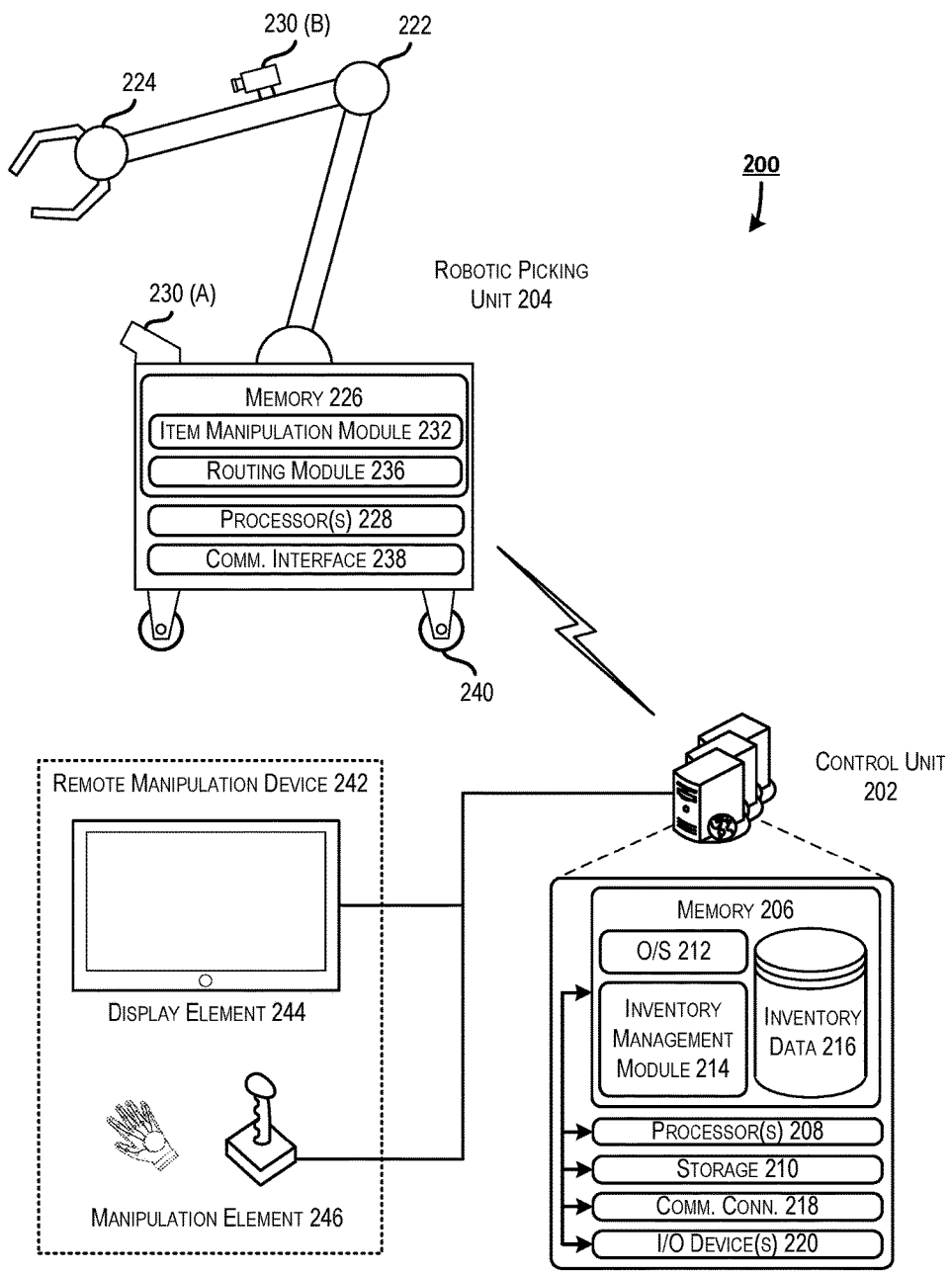
FIG. 2 illustrates an example inventory system architecture that may be implemented in accordance with embodiments of the disclosure.

FIG. 2 illustrates an example inventory system architecture that may be implemented in accordance with embodiments of the disclosure. In architecture 200, a control unit 202 may be in communication with inventory management components, such as a robotic picking unit 204. A robotic picking unit 204 may be an example robotic unit 102 depicted in FIG. 1.

The control unit 202 may be any type of computing device configured to communicate with and one or more inventory management components and one or more operators. In some embodiments, the control unit 202 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 202 may include at least one memory 206 and one or more processing units (or processor(s)) 208. The processor(s) 208 may be implemented as appropriate in hardware, computer-executable instructions, firmware or combinations thereof. Computer-executable instruction or firmware implementations of the processor(s) 208 may include computer-executable or machine executable instructions written in any suitable programming language to perform the various functions described.

The memory 206 may store program instructions that are loadable and executable on the processor(s) 208, as well as data generated during the execution of these programs. Depending on the configuration and type of control unit 202, the memory 206 may be volatile (such as random access memory (RAM)) and/or non-volatile (such as read-only memory (ROM), flash memory, etc.). The control unit 202 may also include additional storage 210, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 206 may include multiple different types of memory, such as static random access memory (SRAM), dynamic random access memory (DRAM) or ROM. Turning to the contents of the memory 206 in more detail, the memory 206 may include an operating system 212 and one or more application programs or services for implementing the features disclosed herein including at least a module for managing automated and manual operations of components within the inventory system (inventory management module 214). The memory 206 may also include inventory data 216, which provides information associated with items managed by the inventory system. In some embodiments, the inventory data 216 may be stored in a database.

The memory 206 and the additional storage 210, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 202. The control unit 202 may also contain communications connection(s) 218 that allow the control unit 202 to communicate with a stored database, another computing device or server, user terminals, and/or other components of the inventory system. The control unit 202 may also include input/output (I/O) device(s) and/or ports 220, such as for enabling connection with a keyboard, a mouse, a pen, a voice input device, a touch input device, a display, speakers, a printer, etc.

Turning to the contents of the memory 206 in more detail, the memory 206 may include an operating system 212, a database containing inventory data 216 and the one or more application programs or services for implementing the features disclosed herein, including an inventory management module 214.

In some embodiments, the inventory management module 214 may be configured to, in conjunction with the processors 208, manage inventory retrieval and stowage of items within the inventory management system. In some embodiments, the inventory management module 214 may be configured to receive a request for an item (e.g., a fulfillment order) and provide instructions to a robotic picking unit 204 to retrieve the requested item. In some embodiments, at least a portion of the instructions to retrieve the requested item may cause the robotic picking unit 204 to operate in an automated fashion. The instructions may cause the robotic picking unit 204 to, at some point during execution of the provided instructions, submit a request to the control unit 202 for manual execution of one or more actions by a remote operator. In some embodiments, the inventory management module 214 may be configured to determine whether an item manipulation action should be performed by the robotic picking unit 204 in a manual or automated fashion based at least in part on whether sufficient automated picking instructions are stored in inventory data 216. In some embodiments, the inventory management module 214 may be configured to provide instructions to a robotic picking unit as each previous set of provided instructions is completed. For example, the control unit 202 may be configured to provide instructions to a robotic picking unit 204 to traverse to a particular storage location. Upon arriving at the indicated storage location, the control unit 202 may then provide a set of instructions for identifying an item within the storage location.

Inventory data 216 may be predetermined or it may be dynamically generated. For example, manipulation data associated with an item may be updated as new information is received on that item. In some embodiments, the inventory data 216 may include information related to grasping of items. In some embodiments, the inventory data 216 may include information related to a pose that is appropriate for one or more items. In some embodiments, the inventory data 216 may include a set of instructions for manipulating a particular item learned from one or more interactions by one or more operators to cause a robotic picking unit to automatically retrieve the item.

The robotic picking unit 204 may comprise any robotic device configured to move items from one location to another. The robotic picking unit 204 may include one or more mechanical arms 222 with an end-of-arm tool (EOAT) 224. This is described in greater detail below. It should be noted that although a particular example robotic picking unit 204 is depicted in FIG. 2, the robotic picking unit 204 may be any suitable robotic device, stationary or mobile, which that capability to perform the described functions. In some embodiments, the mechanical arm of a robotics picking unit 204 may include any number of degrees of freedom.

In one illustrative configuration, the robotic picking unit 204 may include at least one memory 226 and one or more processing units (or processor(s)) 228. The processor(s) 228 may be implemented as appropriate in hardware, computer-executable instructions, firmware or combinations thereof. Computer-executable instruction or firmware implementations of the processor(s) 228 may include computer-executable or machine executable instructions written in any suitable programming language to perform the various functions described. Additionally, the robotic picking unit 204 may comprise a number of input sensors 230 (A and B), which detect and provide input related to conditions of an environment that the robotic picking unit 204 is located within.

The memory 226 may store program instructions that are loadable and executable on the processor(s) 228, as well as data generated during the execution of these programs. The memory 226 may include one or more application programs or services for implementing the features disclosed herein including at least a module for determining how to manipulate an item (item manipulation module 232). The memory 226 may also include item force data 234, which provides information associated with forces that may be applied to items managed by the inventory system. The memory 226 may also include a routing module 236, which provides causes the robotic picking unit 204 to traverse to a specified location within an inventory location.

In accordance with at least some embodiments, the item manipulation module 232 may be configured to, in conjunction with the processors 228, determine an appropriate strategy to be used in manipulating an item. For example, the item manipulation module 232 may be configured to determine whether an item should be grasped in an automated manner or grasped via manual control by an operator. In this example, the item manipulation module 232 may assess a pose or position of the item (e.g., using one or more machine vision techniques) to determine whether instructions stored in the inventory data 216 would support automated manipulation of the item. If the item manipulation module 232 determines that sufficient instructions are available for manipulating the item, then the robotic picking unit 204 may select an appropriate grasp to be used on an item based on inventory data 216 and automatically retrieve the item. In some embodiments, the item manipulation module 232 may also be configured to determine an appropriate level of force to be applied to an item from force data stored in association with the item. The item manipulation module 232 may be configured to cause an EOAT 224 to apply the determined level of force to the item in order to stow or retrieve the item. If the item manipulation module 232 determines that insufficient instructions are available for manipulating the item, then the robotic picking unit 204 may submit a request to the control unit 202 for manual manipulation of the item by a remote operator.

The robotic picking unit 204 may include a communication interface 238 that allow the robotic picking unit 204 to communicate with the control unit 202, another computing device or server, user terminals, and/or other components of the inventory system. In some embodiments, the communication interface 238 may comprise a wireless communication mechanism. In some embodiments, the communication interface 238 may comprise a physical wired connection with other components of the system. The communication interface 238 may enable remote operation of the robotic picking unit 204.

In some embodiments, the robotic picking unit 204 may be stationary (e.g., incapable of movement). In some embodiments, the robotic picking unit 204 may be mobile, in that the robotic picking unit 204 is configured to traverse from a first location to a second location. For example, the robotic picking unit 204 may be configured to traverse to a first location, retrieve an item at the first location, traverse to a second location, and place the item at the second location. In these embodiments, the robotic picking unit 204 may include any suitable mobility means 240. For example, the robotic picking unit 204 may include wheels and a motorized engine, such that the robotic picking unit 204 is capable of autonomous movement. In this example, the memory 226 may include a routing module 236, which may be configured to perform automated route guidance. In another example, the robotic picking unit 204 may be located on a track or conveyor belt.

In some embodiments, the inventory system architecture may include one or more remote manipulation devices 242. Remote manipulation device 242 may be an example remote manipulation device 116 of FIG. 1. In some embodiments, a remote manipulation device 242 may include at least a display element 244 and/or a manipulation element 246. Display element 244 may be any component capable of presenting information received from a robotic picking unit 204 to a user. In some embodiments, display element 244 may be a monitor, television, or another suitable display device. Manipulation element 246 may include any suitable mechanism for receiving input from an operator and using that input to control one or more functions of the robotic picking unit. In some non-limiting examples, a manipulation element 246 may be a joystick, sensor gloves, or a motion tracking camera system (e.g., Kinect) based system.

Figure 3:
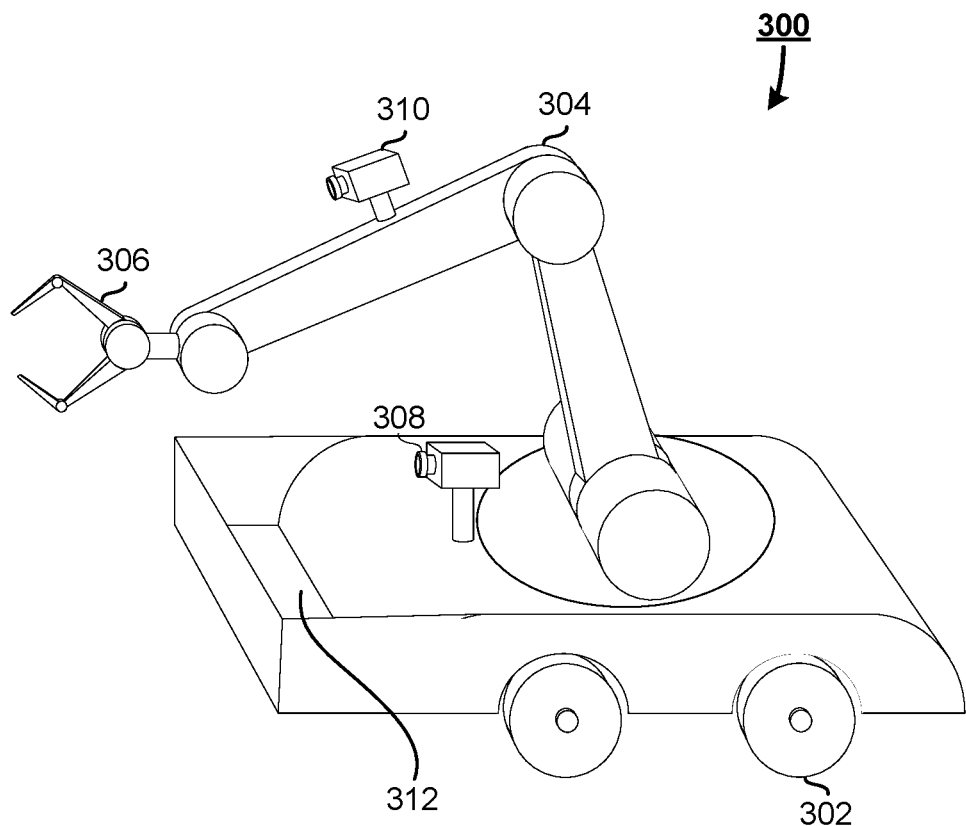
FIG. 3 depicts an illustrative example of a robotic picking unit in accordance with embodiments of the disclosure.

FIG. 3 depicts an illustrative example of a robotic picking unit 300 in accordance with embodiments of the disclosure. Robotic picking unit 300 may be mobile or stationary. In embodiments in which the robotic picking unit 300 is mobile, the robotic picking unit 300 may include a mobile conveyance means 302 (e.g., wheels, tread, conveyor, or any other suitable conveyance mechanism). It should be noted that a number of equivalent conveyance mechanisms are known to one skilled in the art, each of which may be used in embodiments of the disclosure. In some embodiments, the robotic picking unit 300 may include multiple different mobile conveyance means 302. In some embodiments, a robotic picking unit 300 may be an airborne robotic unit (e.g., a drone).

In some embodiments, the robotic picking unit 300 may include a mechanical arm 304 configured to position an EOAT 306 in front of an item. Although FIG. 3 depicts the robotic picking unit 300 as having a single mechanical arm 304, some embodiments of the robotic picking unit 300 may include multiple mechanical arms. In some embodiments, the EOAT 306 may be detachable. For example, the EOAT may be configured to be attached to and unattached to the mechanical arm 304. In some embodiments, an EOAT 306 may be selected for a task by a processor within the robotic picking unit 300 and/or by a control unit, such that the selected EOAT 306 is selected based on its appropriateness for manipulating a particular item or type of item. In some embodiments, the EOAT 306 may be permanently affixed to the mechanical arm 304. For example, the robotic picking unit 300 may be a special-purpose robotic picking unit 300 designed to retrieve and/or stow a particular item or type of item.

In some embodiments, the robotic picking unit 300 may include a number of alternative EOATs that may be swapped out according to requirements associated with the performance of a particular task. In some embodiments, the EOATs may be configured to be swapped out upon receiving instructions from an operator. For example, the operator, upon initiation of the manual operation, may assess a context in which the manual operation is to be completed and may provide instructions to switch between available EOATs. In some embodiments, the inventory management system may instruct a special tooling unit (either a robotic unit or a person) to navigate to a location of the robotic picking unit 300 and swap out a current EOAT being used by the robotic picking unit 300 with one appropriate for the current task.

In some embodiments, the robotic picking unit 300 may include one or more input sensors 308 and 310. Input sensors may include any sensor device capable of obtaining information related to an environment within which the robotic picking unit 300 is located. Some examples of input sensors may include cameras (or other imaging devices), global positioning system (GPS) devices, microphones (or other suitable audio input devices), thermometers, haptic sensors, or any other suitable sensing device. Additionally, robotic units may use a number of techniques to navigate throughout an area (e.g., a fulfillment center). For example, in addition to sensors installed on the robotic unit, the robotic units may use sensors located outside of the robotic unit, bar codes, RFID, and/or Real Time Location Service (RTLS) to navigate. In some embodiments, input obtained by the one or more input sensors may be transmitted to a remote manipulation device. In some embodiments, the robotic picking unit may contain multiple input sensors of the same type, some of which may be used for different purposes. For example, the robotic picking unit 300 may include a first camera device 308 able to obtain image information used in automated routing of the robotic picking unit 300. The robotic picking unit 300 may also contain a second camera device 310 able to obtain image information related to a position or status of the EOAT 306. In this example, the second camera device 310 may be mounted on or in close proximity to the mechanical arm 304 of the robotic picking unit 300.

In some embodiments, the robotic picking unit 300 may include a bin or storage location 312. The storage location 312 may be any area or mechanism on the robotic picking unit 300 designed to hold an item or another storage bin (e.g., a shipping container). It should be noted that some embodiments of the robotic picking unit 300 may not include a storage location 312. For example, a robotic picking unit 300 may be accompanied by a separate robotic device designed carry inventory items (e.g., an automated cart). In some embodiments, the robotic picking unit 300 may be configured to grasp an inventory item, traverse to a different location, and place the inventory item within a shipping container or other storage location.

Figure 4:
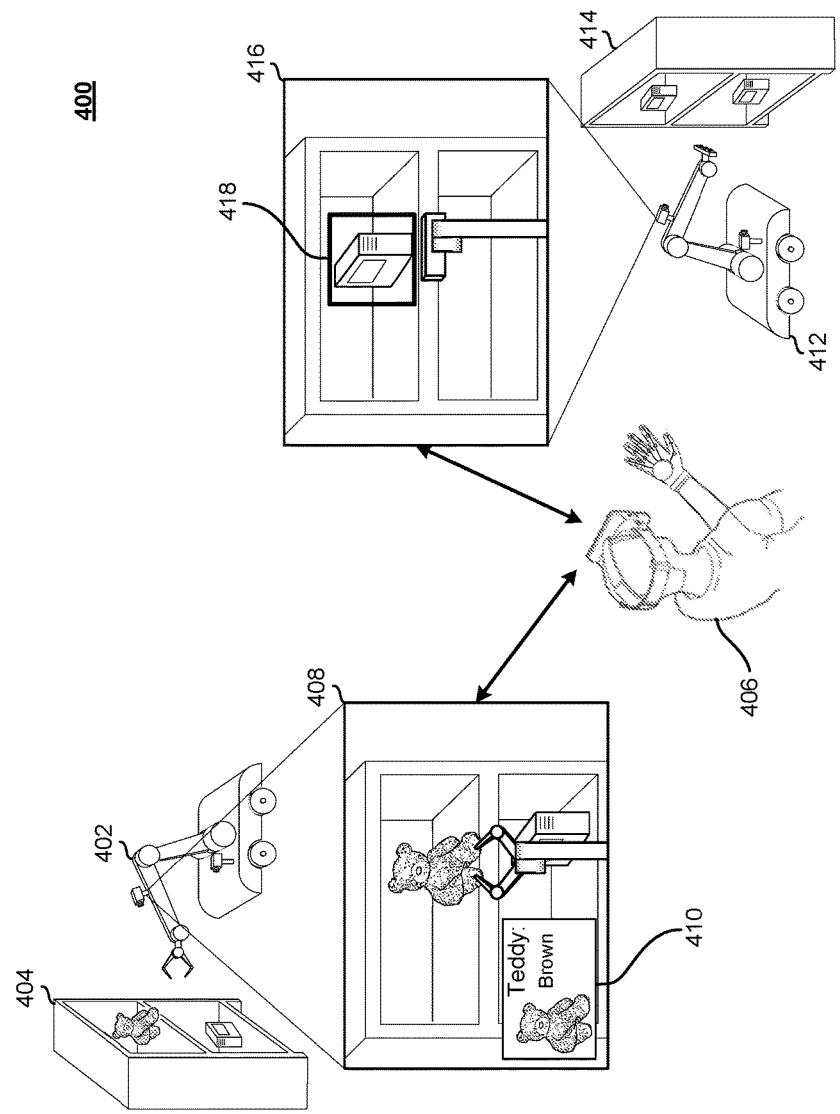
FIG. 4 depicts a first example of a hybrid tele-operated inventory management system in operation.

FIG. 4 depicts a first example of a hybrid tele-operated inventory management system in operation. In FIG. 4, an inventory management system may include a number of mobile robotic picking units. The mobile robotic picking units may be in communication with one or more control units, which provide the mobile robotic picking units with instructions for fulfilling a number of fulfillment orders. In at least some of these embodiments, multiple mobile picking units may be provided with instructions for fulfilling multiple item requests at the same time (e.g., in parallel). The instructions provided to the mobile picking units may include at least some instructions that cause the mobile picking unit to operate in an automated manner (e.g., without user interaction). In some cases, a mobile picking unit may reach a point in the received instructions in which manual operation is necessary. For example, the robotic picking unit may need to manipulate an item for which it does not have sufficient automated manipulation information. In this example, the robotic picking unit may position itself in front of the item to be retrieved and submit a request for manual operation by an operator.

Submitted requests for manual operation may be transmitted to a control unit for subsequent assignment. In some embodiments, the control unit may determine which operators, from a number of operators, may be assigned the manual operation. In some embodiments, the control unit may add the request to a queue of such requests that are being worked by the number of operators. In some embodiments, assignment of a manual operation to an operator may be made based on an expertise of that operator. For example, manual operation of a robotic forklift may be assigned to an operator certified to operate a forklift. In another example, manual retrieval of a particular item may be assigned to an operator that is familiar with that particular item (e.g., an operator capable of discerning between like items). In some embodiments, the control unit may obtain statistical information with respect to the operators, upon which it may base future assignment decisions. For example, the control unit may obtain metrics related to a number of manual operations that a particular operator performs within a specified timeframe (e.g., operations per hour). In another example, the control unit may obtain metrics on how many manual operations for an operator are not completed or result in a broken item. These metrics may be used to disqualify the operator from further manual operations or to limit that operator to only non-fragile items.

Once the request has been assigned to an operator or the operator selects the request, the operator may use a remote manipulation device to gain control of the robotic picking unit and to cause the EOAT of the robotic picking unit to grasp the item. In some embodiments, the remote manipulation device may receive image information, which depicts objects in the vicinity of the EOAT. In some embodiments, image information may be augmented to include additional information to be provided to the remote manipulation device.

Once the requested manual operation has been completed (e.g., by receiving an indication of completion from the operator), the remote manipulation device may be disconnected from the robotic picking unit. In some embodiments, the control unit may then select the next request for manual operation in the queue and establish a connection between the remote manipulation device and the robotic picking unit that submitted the request. This creates a system in which operator downtime is minimized during fulfillment of item requests.

By way of illustrative example, a control unit may provide instructions to a number of robotic picking units to retrieve various inventory items for fulfillment of item orders. In this example, a robotic picking unit 402 may, upon reaching a storage location 404 associated with an inventory item with which robotic picking unit 402 is tasked to retrieve, submit a request for manual operation. In some embodiments, the robotic picking unit 402 may identify the item within the storage location 404. For example, the robotic picking unit 402 may use machine vision along with one or more item identification techniques to determine a precise location of the item within the storage location 404. In some embodiments, the robotic picking unit 402 may be configured to read barcodes or other machine readable code to identify items within the storage location 404.

The control unit may receive the request and determine that an operator of a remote manipulation device 406 is available to perform the manual manipulation operation. The control unit may establish a connection between the robotic picking unit 402 and the remote manipulation device 406 that involves relaying image information 408 obtained by a camera device on the robotic picking unit 402 to the remote manipulation device 406 and relaying commands received by the remote manipulation device 406 as input from the operator to the robotic picking unit 402. In some embodiments, the image information 408 may be augmented to include additional information 410. For example, the control unit may overlay a portion of the image information 408 with an image of the item to be retrieved or other descriptive material related to the manual operation (e.g., a color of the item, a basic description of the item, or any other suitable descriptive material). The operator may use the image information 408 to identify and retrieve the requested item. To do this, the remote manipulation device may be used to control a grasping function on the EOAT on the robotic picking unit 402. Additionally, the remote manipulation device may be used to control a positioning of the EOAT (e.g., by actuating one or more actuators on a mechanical arm or causing the robotic picking unit to move). It should be noted that means for remotely controlling a device in this fashion are well known to those skilled in the art and will not be described in detail here.

Once the operator of remote manipulation device 406 has completed the requested manual operation, the control unit may sever the connection between the remote manipulation device 406 and the robotic picking unit 402. The control unit may then determine that robotic picking unit 412 has previously submitted a request for manual operation, for which the operator of the remote manipulation device 406 is qualified to perform. At some time previous to submission of the request for manual operation, the robotic picking unit 412 may have traversed, using automated means, to a storage location 414 within which is stored an item to be retrieved by the robotic picking unit 412. The control unit may establish a connection between the robotic picking unit 412 and the remote manipulation device 406 that involves relaying image information 416 obtained by a camera device on the robotic picking unit 412 to the remote manipulation device 406 and relaying commands received by the remote manipulation device 406 as input from the operator to the robotic picking unit 412. In some embodiments, the image information 416 may be processed using one or more machine vision techniques to identify the item within the image information 416. Upon identifying the item within the image information, the control unit may augment the image information 416 with some indication 418 of the item to be retrieved. In some embodiments, the indication 418 may comprise a boundary, outline of the item, highlighting of the item, or any other suitable indication of the item's location.

Once the operator of remote manipulation device 406 has completed the requested manual operation, the control unit may sever the connection between the remote manipulation device 406 and the robotic picking unit 412. The control unit may then identify the next request for manual operation in the queue to be performed by the operator of the remote manipulation device 406. The process in this example may be repeated multiple times.

In some embodiments, the operator may be located remote from the inventory fulfillment center in which the disclosed inventory management system is located. For example, the operator may be located in a different country than the fulfillment center. In some embodiments, the control unit may select a particular operator and/or remote manipulation device to perform a particular manual operation. In some embodiments, particular operators may be selected by a control unit based on information associated with the operator. For example, a particular operator may be selected to perform a manual operation based on time zone information, language, experience, labor costs, experience on similar issues, or any other suitable factor. In some embodiments, operators may be compensated for their participation in the disclosed inventory management system. For example, an operator may be employed by an owner of the inventory management system. In another example, an operator may be compensated based on the manual operations performed. In this example, the operator may be a member of a crowdsourcing website in which users are able to select and perform various manual operations.

In some embodiments, multiple operators may use remote manipulation devices to operate a virtual robot that represents the robotic unit within a virtual reality environment. The operators may be given a scenario in which a representation of the item to be manipulated is presented in the virtual environment in a pose similar to that of the actual item. In these embodiments, each operator's approach to retrieving or otherwise manipulating the item may be recorded by the system. The system may then determine which approach used by the operators was most effective. For example, the system may identify a number of metrics to be associated with each approach in order to determine which approach results in the best time for the manipulated item, the best placement pose for the item, the fewest manipulation actions, or any other suitable metric. In some embodiments, each metric may be given a weight, and a "best" approach may be identified by summing each of the metrics according to their assigned weights. In some embodiments, each approach may be recorded and presented to a user or a number of users, who may be given the ability to vote on a particular approach. In at least some embodiments of the inventory management system described herein, a best approach for a manual operation or multiple manual operations may be identified in this manner prior to operation of a robotic unit. Once the robotic unit encounters the manual operation for which the best approach has been identified, the robotic unit may perform the best approach automatically (e.g., without operator intervention) to manipulate the item.

Figure 5:
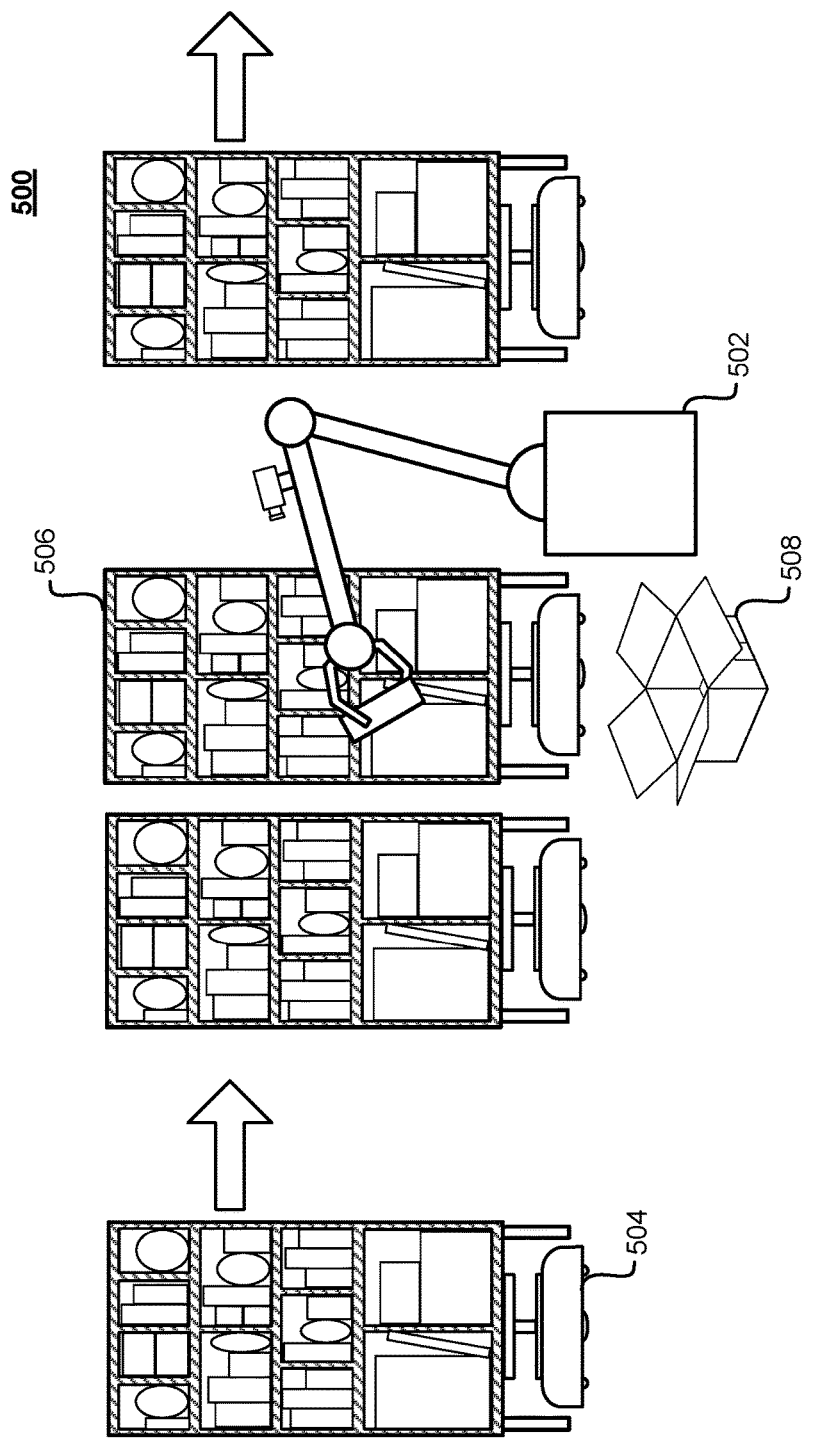
FIG. 5 depicts a second example of a hybrid tele-operated inventory management system in operation.

FIG. 5 depicts a second example of a hybrid tele-operated inventory management system in operation. In FIG. 5, an inventory management system may include at least one stationary robotic picking unit 502 and a number of mobile drive units 504 configured to position storage bins 506 in front of the robotic picking unit 502. The operation of mobile drive units in this fashion is described in U.S. Pat. No. 7,912,574, issued Mar. 22, 2011, entitled "System and Method for Transporting Inventory Items," which is herein incorporated by reference in its entirety.

In some embodiments, the inventory management system may receive an order for a number of items to be shipped to a consumer. The inventory management system may select a shipping container 508 that is appropriate for the order (e.g., of sufficient size to hold the requested items) which may be placed in proximity to the stationary robotic picking unit 502. During fulfillment of the order, a storage bin 506 containing at least a first item to be placed in the shipping container 508 may be transported to the robotic picking unit 502 automatically by a mobile drive unit 504. During the transportation of the storage bin 506 to the robotic picking unit 502, the robotic picking unit may be inactive. Upon arrival of the storage bin 506, the robotic picking unit 502 may locate the requested item and determine whether that item may be retrieved in an automated manner. If the robotic picking unit 502 is unable to retrieve the item automatically, it may position itself so that an EOAT of the robotic picking unit 502 is in proximity to the requested item. The robotic picking unit 502 may then submit a request to the control unit for manual operation to retrieve the item. It should be noted that a robotic picking unit may be mounted in a number of ways. For example, the robotic picking unit may be mounted on the ceiling or a wall. In some embodiments, the robotic picking unit may comprise multiple robotic units.

For example, robotic picking unit 502 may include both a robotic unit mounted on the floor and a robotic unit mounted on the ceiling.

Similar to the embodiment of the system described with respect to FIG. 4 above, the request for manual operation may enter a queue of similar requests. Once the request has been assigned to an operator, the operator may take control of the robotic picking unit 502 to remove the requested item from the storage bin 506 in a manner similar to that described above. Once this has been completed, the storage bin 506 may be returned to its original location (or another appropriate location) automatically and the operator may be disconnected from the robotic picking unit 502 and assigned the next manual operation request in the queue. However, in some embodiments, the operator may continue to operate the robotic picking unit 502 throughout a period of time (e.g., a shift) or for the duration of an order. For example, a number of storage bins 506 may have been positioned close to (e.g., lined up at) the robotic picking unit 502. As an appropriate item is removed from each storage bin 506, that storage bin 506 may be removed and another storage bin may be moved into its place. This may continue until each of the storage bins 506 has been dealt with.

In some embodiments, the storage locations 506 may be fitted with one or more cameras. In these embodiments, the operator may be provided access to image information captured by the one or more cameras in addition to, or instead of, image information received from the robotic unit. For example, the operator may be provided a feed of image information received from the robotic unit that is augmented with a window that depicts a feed of image information received from the storage bin 506. It should be noted that the implementation of certain embodiments described herein allow for a much more extended reach than is typically available to a human actor. Accordingly, the storage bins 506 may be much taller than those utilized in conventional systems. This may result in a more optimal use of available storage space over conventional inventory management systems.

In some embodiments, once each of the items is determined to have been placed in the shipping container 508, the inventory management system may send a unit to retrieve the shipping container. In some embodiments, the shipping container 508 may be replaced by a shipping container associated with the next order in an order fulfillment queue. In some embodiments, a quality assurance (QA) unit or person may assess the items within the shipping container 508 upon its retrieval. For example, a QA unit may check a status of the items within the shipping container 508 by ensuring that they are properly packed, all accounted for, unbroken, etc. In some embodiments, a QA unit may provide feedback to the control unit regarding the status of items in the shipping container 508. In some embodiments, the status may be used to obtain metrics associated with a particular operator. The control unit may use these obtained metrics to make future manual operation assignments.

Figure 6:
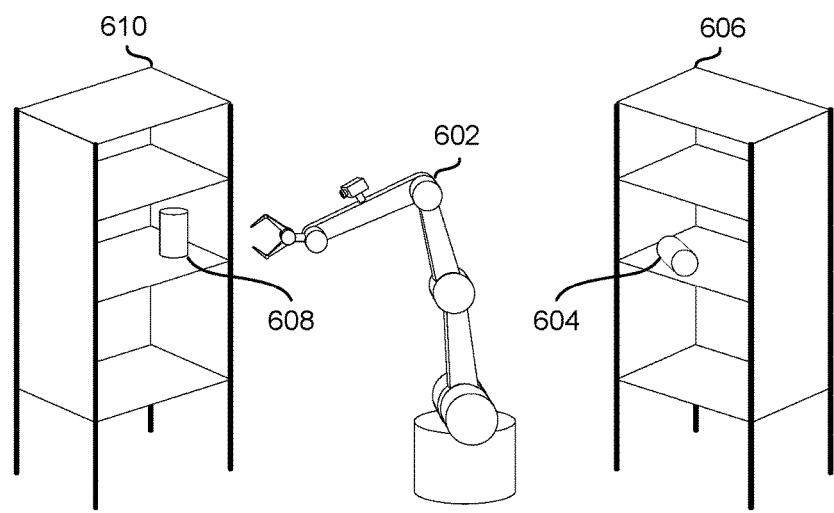
FIG. 6 depicts an example of a process by which a robotic picking unit may perform a second task while awaiting initiation of a manual operation in accordance with at least some embodiments.

FIG. 6 depicts an example of a process by which a robotic picking unit may perform a second task while awaiting initiation of a manual operation in accordance with at least some embodiments. In FIG. 6, the second task may be identified by the robotic picking unit 602 (e.g., the second task may be a task other than the current task in a list of tasks to be completed by the robotic picking unit 602) or the second task may be identified by a control unit 202 as described with respect to FIG. 2.

In some embodiments, the robotic picking unit 602 may identify a first item 604 to be retrieved or otherwise manipulated. In some embodiments the robotic picking unit may come into proximity of a storage bin 606 that includes the item 604. For example, the robotic picking unit 602 may traverse to the storage bin 606, or the storage bin 606 may be transported to the robotic picking unit 602. Upon coming into proximity of the storage bin 606, the inventory management system may determine that the item 604 is unable to be manipulated without operator intervention. Upon making that determination, the inventory management system may determine whether it is appropriate to perform a second task. For example, the inventory management system may have insufficient manipulation data regarding a particular pose that the item 604 is stored in. In this example, upon determining that a manual operation is required with respect to a current item 604, the inventory system may calculate an amount of time that will likely transpire before an operator is able to initiate a manual operation (e.g., a wait time). The inventory management system may then determine whether a second task can be performed within this amount of time.

A second task to be performed by the robotic picking unit 602 may be any task identified by the inventory management system as being able to be performed by the robotic picking unit 602. The second task may be a task subsequent to a current task in a list of tasks to be completed by the robotic picking unit 602 or it may be a task originally intended to be assigned to a different robotic picking unit. In some embodiments, the inventory management system may determine that the robotic picking unit 602 is proximate to a second item 608 which can be manipulated and that also needs to be retrieved or otherwise manipulated (e.g., the second item 608 may be relevant to fulfillment of the same order or a different order). In his example, the second item 608 may be located in the same storage bin 606 or it may be location in a second storage bin 610. The inventory management system may provide instructions to the robotic picking unit 602 to manipulate the second item 608. Once the second task has been completed by the robotic picking unit 602, the robotic picking unit 602 may be configured to reposition itself in anticipation of the manual operation.

In some embodiments, once the second task has been completed by the robotic picking unit 602, the inventory management system may determine that there is sufficient time remaining in the amount of time before initiation of the manual operation to complete a third or subsequent task. In this example, the inventory management system and/or robotic picking unit 602 may be configured to execute that task. For example, the second storage bin 610 may be transported away by a mobile drive unit and replaced by a third storage bin that includes a third item to be manipulated. In this example, the robotic picking unit 602 may be instructed to manipulate the third item.

Figure 7:
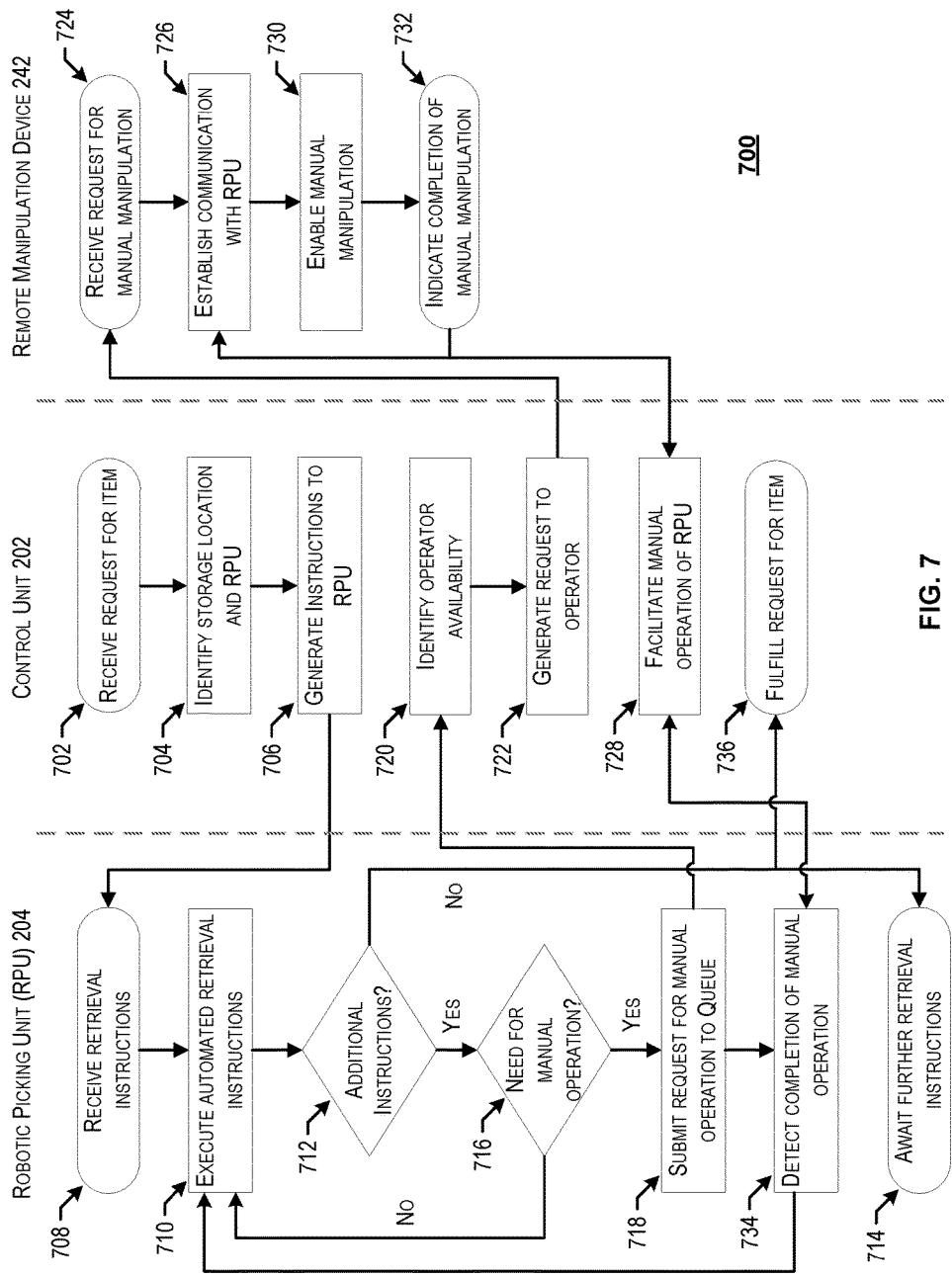
FIG. 7 depicts a flow chart illustrating a process for operating an inventory system using remote operators in accordance with at least some embodiments.

FIG. 7 depicts a flow chart illustrating a process for operating an inventory management system using remote operators in accordance with at least some embodiments. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 700 may be performed by an example robotic picking unit (RPU) 204, a control unit 202, and a remote manipulation device 242, each of which is depicted with respect to FIG. 2.

Process 700 may begin at 702, when a request is received by a control unit 202 with respect to an item managed by the inventory management system. In some embodiments, the request for an item may take the form of an order placed by a consumer for an item managed by the inventory management system. In some embodiments, an order placed by a consumer may contain multiple items. In some embodiments, the inventory management system may handle each of the items in the order separately by separating the order into multiple item requests. In some embodiments, the inventory management system may handle the order as a whole by generating an item request including multiple items at potentially multiple storage locations.

At 704, the control unit may identify a storage location associated with the item as well as an appropriate RPU. The control unit may identify the storage location by querying inventory data stored in a database. In some embodiments, the control unit may also have stored an indication of the type of EOAT needed to interact with a particular item or type of item. For example, if the item is in a relatively-flat plastic packaging, then it may be appropriate to select a robotic unit that has equipped a suction cup manipulator tool (e.g., a vacuum suction cup pneumatic manipulator). In another example, if the item is relatively elastic then it may be appropriate to select a robotic unit that has equipped a grasping item manipulator tool. In some embodiments, the control unit may consult with an item grasp database to identify an appropriate robotic unit. The selection of an appropriate robotic unit may also be made based on any suitable factor relevant to the item to be manipulated (e.g., a size or weight of the item). In some embodiments, the selection of an appropriate robotic unit may also be made based on a location for each of the available robotic units.

At 706, the control unit may generate retrieval instructions to be executed by the selected RPU. In some embodiments, the instructions may include a set of storage locations and items within those storage locations. In some embodiments, the instructions may include routing information to be used by the robotic unit. For example, the control unit may determine a current location of the robotic unit as well as a location of a storage location to which the robotic unit is to traverse. The control unit may then generate routing instructions that, when executed by the robotic unit, will cause the robotic unit to traverse to the identified storage location. In some embodiments, routing instructions generated by the control unit may account for routes being traversed by other robotic units within the inventory management system. In some embodiments, the instructions may include grasp data or information related to manipulation of a particular item. For example, the instructions may include a subset of instructions that, when executed by the robotic unit, causes the robotic unit to retrieve a particular item or type of item from a storage location in an automated fashion.

At 708, the RPU 204 may receive the retrieval instructions from the control unit 202. In some embodiments, the instructions may be transmitted to the robotic unit via a wireless network connection. For example, each of the robotic units may be in communication with the control unit via a wireless network. In some embodiments, the robotic unit may receive the set of instructions via a direct physical connection. For example, a stationary robotic unit may share a direct communication channel with a control unit, over which communications may be routed. In another example, a robotic unit may receive instructions from the control unit while the robotic unit is docked (e.g., at a charging station) via a direct physical connection.

At 710, the RPU may execute a subset of the instructions intended to be executed in an automated manner. For example, the RPU may receive instructions to traverse to a first storage location and retrieve a first item. Even if the RPU cannot retrieve the item automatically, it may automatically traverse to the storage location. In some embodiments, each RPU may include a separate routing module configured to generate instructions for traversing to the identified storage location. In some embodiments, the RPU may receive routing instructions from the control unit to cause the RPU to traverse to a location.

At 712, the RPU may determine whether there are additional instructions to be executed. If no additional instructions are to be executed by the RPU (e.g., the requested item has been retrieved and stowed in the appropriate place), the RPU may end the retrieval process and await new retrieval instructions at 714. Otherwise, the RPU may determine whether the additional instructions are to be performed manually at 716. If the additional instructions may be automated, then the process 700 loops back to 710. Otherwise, the RPU may generate a request for manual operation and submit the generated request to the control unit 202 at 718. In some embodiments, the request is added to a queue of such requests submitted by other RPUs within the inventory management system. In some embodiments, the control unit may determine that the RPU has arrived at a specified location, or has otherwise fulfilled a predetermined condition, and may generate a request for manual operation based on the RPU having met that predetermined condition. The RPU may, prior to fulfillment of the request for manual operation, position itself in front of the item for which manual operation is required.

At 720, the control unit 202 receives the generated request for manual operation (e.g., when it reaches the top of the queue) and determines whether an operator is available to perform the requested manual operation. In some embodiments, the control unit may assign the received request to the next available operator. In some embodiments, the control unit may select an operator that is appropriate for the type of manual operation requested. For example, the control unit may determine that the EOAT installed on a particular RPU should only be operated by a subset of operators. In this example, the control unit may assign the received request for manual operation to the first available operator from that subset.

At 722, the control unit may generate a request to a remote manipulation device 242 associated with the identified operator. At 724, the remote manipulation device 242 may receive the request for manual operation from the control unit 202. Based on the received request, the remote manipulation device 242 may establish a communication session with the RPU at 726. As depicted in process 700, the communication session may be routed through, and facilitated by, the control unit 202 at 728. In some embodiments, the control unit 202 may append or augment information transmitted between the remote manipulation device 242 and the RPU 204. For example, the control unit 202 may add an overlay to image information received from the RPU which depicts a descriptor (e.g., an image) of an item to be manipulated by the operator of the remote manipulation device 242. The augmented image information may then be forwarded to the remote manipulation device 242.

At 730, the remote manipulation device 242 may enable manual operation of the RPU by the operator. For example, the remote manipulation device 242 may receive operator input and may translate that operator input into computer-executable instructions to be executed by the robotic unit. In some embodiments, the computer-executable instructions may activate various actuators (e.g., motors) of the RPU to move the RPU, move a mechanical arm on the RPU, effect an EOAT of the RPU (e.g., open and/or close a grasping tool), or cause the RPU to perform any other suitable action.

At 732, the remote manipulation device 242 may receive an indication that the manual operation has been completed. For example, the operator of the remote manipulation device 242 may indicate that the request has been completed. In some embodiments, the operator may press a button or take another suitable action to indicate the completion of the manual operation.

Once an indication has been received that the manual operation has been completed at 734, the RPU may execute a second subset of the instructions intended to be executed in an automated manner. The process 700 may be completed upon determining that each of the instructions provided to the RPU have been completed in either an automated or manual fashion. Once this is accomplished, the control unit 202 may cause a fulfillment system to fulfill the received order at 736. For example, the control unit, upon determining that each item to be fulfilled in the order has been retrieved and placed in a shipping container, may cause the shipping container to be sealed and/or placed in an outgoing parcel queue.

Figure 8:
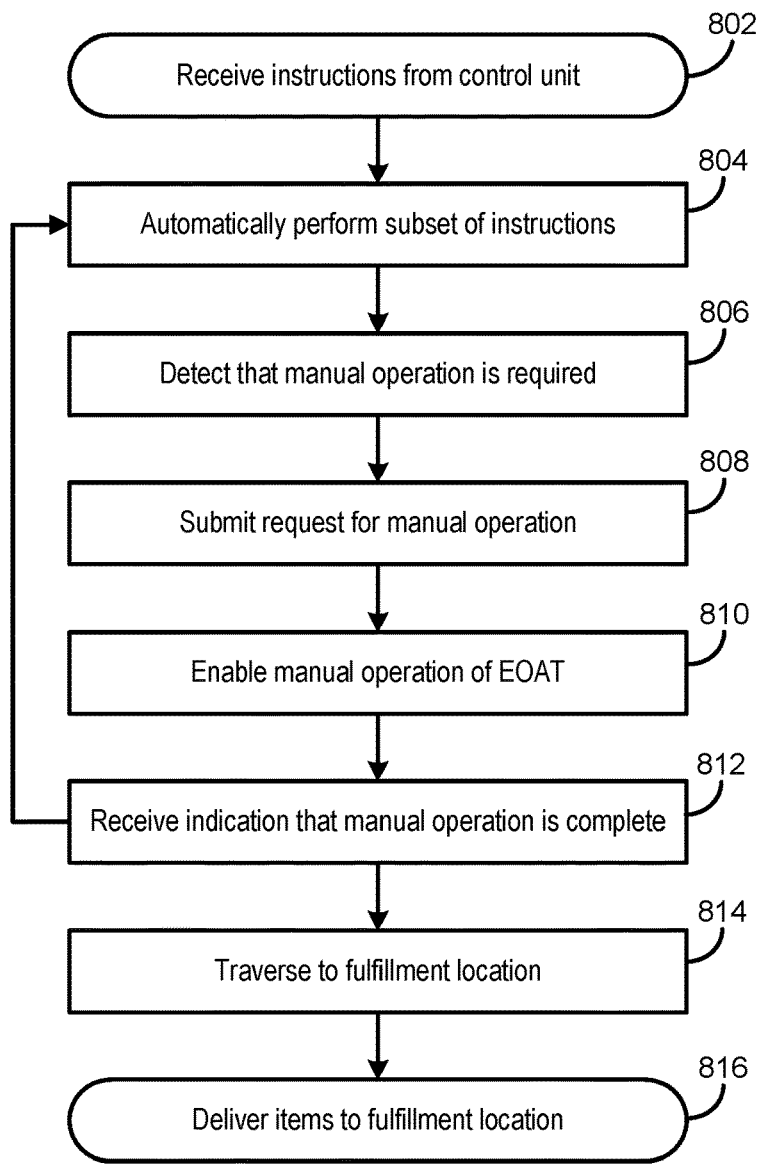
FIG. 8 depicts a flow diagram illustrating a process for operating a robotic unit in an automated and manual fashion in accordance with at least some embodiments.

FIG. 8 depicts a flow diagram illustrating a process for fulfilling an order using a robotic unit in an automated and manual fashion in accordance with at least some embodiments. Process 800 may be performed by a robotic unit 102 as depicted in FIG. 1.

Process 800 may begin at 802, when instructions are received from a control unit. In some embodiments, the instructions may include one or more storage locations and one or more items to be retrieved from the one or more storage locations. In some embodiments, the instructions may include instructions for manipulating the item in an automated manner. For example, the control unit may learn (e.g., by observing operator interactions) an appropriate technique for retrieving an item. Once this technique is learned, the control unit may store instructions that cause a robotic unit to act in accordance with that technique.

At 804, the robotic unit may automatically perform a subset of the received instructions. For example, the instructions may include an indication of a storage location from which one or more items are to be retrieved. In this example, the robotic unit may automatically traverse to the indicated storage location. The robotic unit may also automatically identify the item within the storage location and position an EOAT proximate to that item. For example, the robotic unit may scan barcodes associated with one or more items within the storage location to identify the item to be retrieved. In another example, the robotic unit may use machine vision with one or more item recognition techniques to identify the item. In some embodiments, the robotic unit may identify a pose, (e.g., a position) of the item within the storage location.

At 806, the robotic unit may determine that manual operation of the robotic unit is necessary. For example, the robotic unit may be unable to identify the item within the storage location, which may result in requiring an operator to locate the item. In another example, the robotic unit may identify the item within the storage location, but may not have appropriate instructions for handling the item. In another example, the storage location may be too tightly packed for the robotic unit to manipulate the item without assistance.

At 808, the robotic unit may submit a request for performance of the manual operation. In some embodiments, the robotic unit may submit the request to a generic queue for such requests. In some embodiments, the robotic unit may submit the request to a queue based on a type of manual operation to be performed. For example, the robotic unit, upon determining that a manual operation is necessary to retrieve an item from a storage location, may submit a request to a queue intended for retrieval of items. In another example, the robotic unit, upon determining that the item is to be placed within a shipping container or other storage location, may submit the request to a queue intended for packing of items. In some embodiments, operators may specialize in a particular type of manual operation. For example, some operators may specialize in retrieval of items from storage locations whereas other operators may specialize in packing items into storage locations. In this example, operators may be assigned requests for manual operations based on specialties associated with those operators.

At 810, the robotic unit may enable manual operation of its EOAT and/or other functions. For example, the robotic unit may receive operator input (e.g., received via a remote manipulation device) which causes various actuators of the robotic unit to be activated. For example, the robotic unit may move, turn, reposition a mechanical arm, effect an EOAT, or perform any other suitable action. At 812, the robotic unit may receive an indication that the manual operation has been completed. In some embodiments, this may be a severing of the communication session between the robotic unit and the remote manipulation device.

At 814, the robotic unit may automatically traverse to a fulfillment location. The robotic unit may deliver one or more of the retrieved items to the fulfillment location at 816. For example, the robotic unit may traverse to the fulfillment location and place the retrieved item into a shipping container. In another example, the robotic unit may carry the shipping container to a number of storage locations that each contain at least one of the items to be fulfilled in an order. The robotic unit may, upon completing the order by retrieving each of the items to be fulfilled, place the shipping container in a fulfillment location for further processing and/or shipment to a consumer. The control unit may, upon receiving an indication that an item has been retrieved from a storage location, update inventory information to reflect that the item is no longer available at that storage location.

Figure 9:
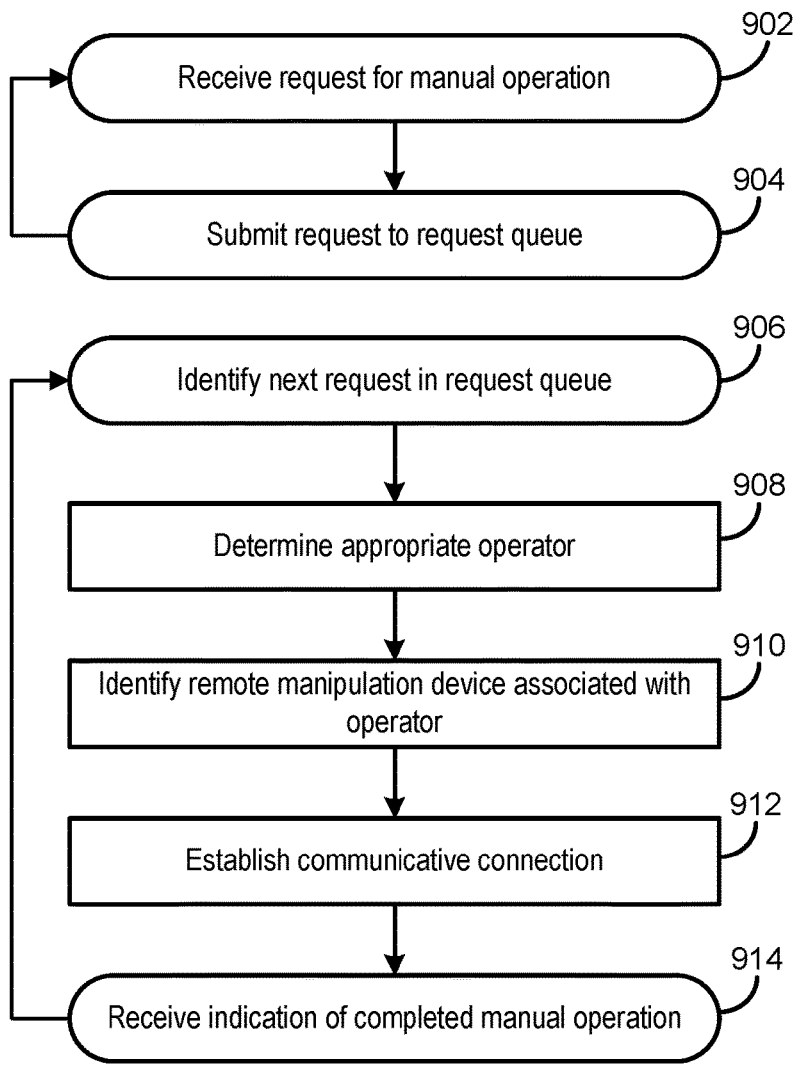
FIG. 9 depicts a flow diagram illustrating a process for enabling an operator to complete a series of manual operations with multiple robotic units in accordance with at least some embodiments.

FIG. 9 depicts a flow diagram illustrating a process for enabling an operator to complete a series of manual operations with multiple robotic units in accordance with at least some embodiments. Process 900 may be performed by a control unit 202 as depicted in FIG. 2.

Process 900 may begin at 902, when a request is received by the control unit from a robotic unit for manual operation. At 904, the control unit may submit the received request to a request queue, within which the request will be prioritized. The request may be processed according to its determined priority. This process may be repeated each time that a request is received for manual operation from a robotic unit.

During operation of the inventory management system described, the control unit may identify a request that is next in the request queue at 906 (e.g., a request in the request queue having the highest priority). In some embodiments, requests may be prioritized based on one or more characteristics of the requests. For example, requests of a certain type or category may be prioritized. In another example, requests associated with expedited orders may be prioritized.

Once a request reaches the highest priority in a queue, the control unit may determine an appropriate operator to handle the request at 908. In some embodiments, the appropriate operator may be determined based on a skillset or certification of the operator. In some embodiments, the appropriate operator may be determined based on availability of the operator. In some embodiments, an appropriate operator may be selected based on a geographic location or time zone of the operator. In some embodiments, an appropriate operator may be selected based on capabilities, or a type, of remote manipulation device operated by the operator. In some embodiments, the control unit may determine an appropriate operator based on the operator indicating that he or she will handle the request.

Once an appropriate operator has been determined, the control unit may identify a remote manipulation device associated with that operator at 910. For example, the control unit may query a database of operator/remote manipulation device mappings to identify an appropriate remote manipulation device. In some embodiments, the control unit may transmit a request to an internet protocol (IP) address associated with the operator.

The control unit may establish a communicative connection between the robotic unit and the remote manipulation device at 912. In some embodiments, establishing the communicative connection may comprise relaying image information received by the robotic unit to the remote manipulation device and relaying commands receive by the remote manipulation device (e.g., from the operator) to the robotic unit. The commands may cause the robotic unit to perform the manual operation.

At 914, the control unit may receive an indication that the manual operation has been completed. Upon receiving this indication, the control unit may sever the communicative connection between the robotic unit and the remote manipulation device. In some embodiments, the steps described with respect to 906 through 914 may be repeated on a continuous basis. In some embodiments, the control unit may constantly identify pending requests, determine which operator is available to complete the request, assign that request to the determined operator (e.g., by establishing a connection with a remote manipulation device for that operator), and move on to the next pending request.

Embodiments of the disclosure provide for a number of technical advantages over conventional inventory management systems. For example, embodiments of the disclosure enable remote operation of an inventory fulfillment center from anywhere in the world, which enables virtualization of tasks which previously required operators to be on-site. Virtualization of these tasks provides the ability to take advantage of differences in labor costs or labor availability based on location. Additionally, virtualization of tasks enhances safety for worker who no longer need to be in the same area as mobile robotic units.

Additionally, the disclosure results in significant improvements to the functionality of the inventory management system as a whole. For example, by automating traversal to and from storage locations, and by switching to manual operation of each device when it is ready to be controlled (e.g., those from which requests have been received), downtime for each operator is minimized or eliminated. Minimizing downtime enables more orders to be fulfilled by each operator of the inventory management system. Additionally, the described system may enable each operator to control each device, so that no particular operator is causing a bottleneck or slowing the system as a whole.

Furthermore, by implementing embodiments of the disclosure, an operator of a fulfillment center maybe able to use taller storage bins relative to fulfillment centers that rely only on human pickers, as robotic picking units may be configured to have higher reach than human pickers. Accordingly, fulfillment centers using embodiments of the disclosure may maximize available storage space by increasing items stored per square foot of fulfillment center relative to fulfillment centers that rely only on human pickers.

Figure 10:
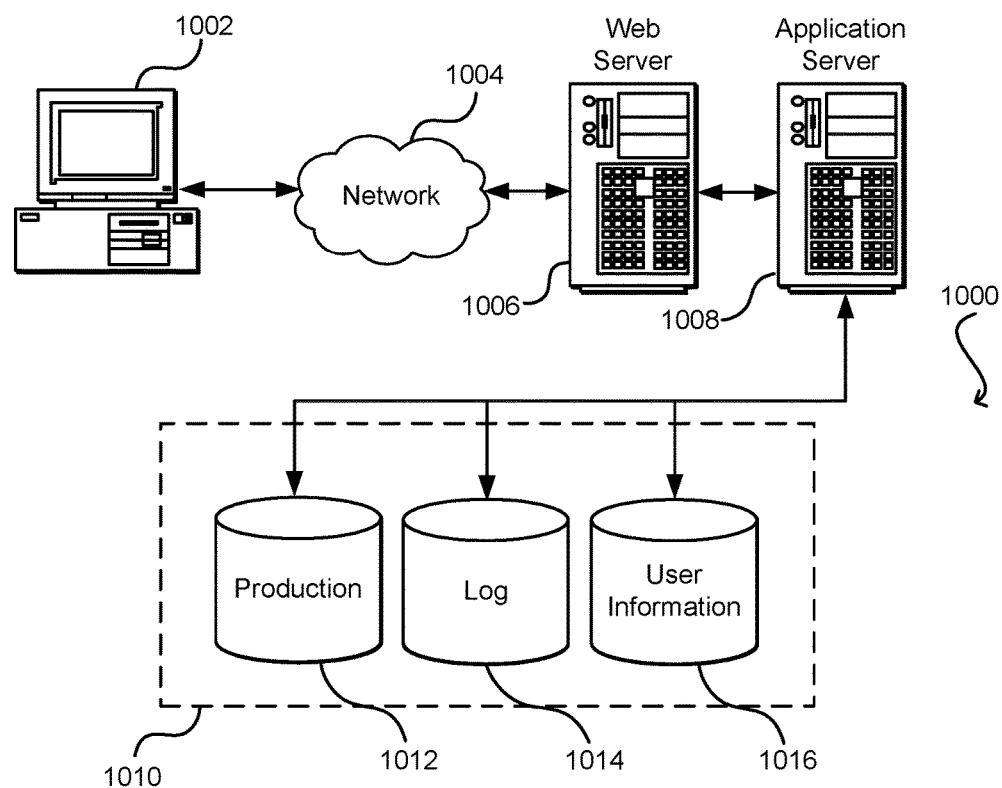
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory system, comprising:
a plurality of robotic units;
a remote manipulation device associated with an operator;
a processor; and
a memory including instructions that, when executed with the processor, cause the inventory system to, at least:
receive, from at least one robotic unit of the plurality of robotic units, a request for manual operation with respect to a task to be completed, the task being one of a plurality of tasks received by the plurality of robotic units, and wherein the inventory system is configured to receive the request for manual operation during automated execution of a set of instructions by the at least one robotic unit responsive to a determination that a condition has been met for requesting manual operation;
identify the operator to complete the task based at least in part on a type associated with the task;
identify the remote manipulation device associated with the operator;
establish a connection between the remote manipulation device and the at least one robotic unit, the connection enabling movement of the at least one robotic unit to be executed by the operator in accordance with a motion provided with the remote manipulation device;
record operations performed by the operator while controlling the at least one robotic unit;
determine a subsequent task of the plurality of tasks for a robotic unit of the plurality of robotic units; and
identify instructions for automated execution of the subsequent task by the robotic unit, wherein the instructions are determined based at least in part on a pattern identified from the operations performed by the operator as recorded, the pattern being identified based at least in part on a machine learning technique.

2. The inventory system of claim 1, wherein the instructions, when executed with the processor, are further configured to cause the inventory system to identify the operator further based at least in part on an availability associated with the operator.

3. The inventory system of claim 1, wherein the instructions that identify the operator identify the operator further based at least in part on characteristics associated with the operator.

4. The inventory system of claim 1, wherein the instructions, when executed with the processor, are further configured to cause the inventory system to add the request for manual operation to a queue of requests.

5. The inventory system of claim 1, including further instructions that, when executed with the processor, cause the inventory system to, at least:
record sets of operations corresponding to respective tasks performed by a set of respective operators, wherein the instructions are determined based at least in part on the pattern, and wherein the pattern is identified further based at least in part on the sets of operations and the machine learning technique.

6. A computer-implemented method, comprising:
receiving, from at least one robotic unit of a plurality of robotic units, a request for manual operation, wherein the request for manual operation is received during automated execution of a set of instructions by the at least one robotic unit responsive to a determination that a condition has been met for requesting manual operation;
identifying, based at least in part on the request, an operator to complete a manual operation based on a type of the manual operation;
identifying a remote manipulation device associated with the operator;
establishing a communicative connection between the remote manipulation device and the at least one robotic unit, the communicative connection enabling movement of the at least one robotic unit to be executed by the operator in accordance with a motion provided with the remote manipulation device;
recording operations performed by the operator while controlling the at least one robotic unit;
determining a subsequent task of a plurality of tasks for a robotic unit of the plurality of robotic units; and
identifying instructions for automated execution of the subsequent task by the robotic unit, wherein the instructions are determined based at least in part on a pattern identified from the operations performed by the operator as recorded, the pattern being identified based at least in part on a machine learning technique.

7. The computer-implemented method of claim 6, further comprising:
receiving, from the at least one robotic unit of the plurality of robotic units, a second request for manual operation;
identifying, based on the second request, a second operator to complete the second manual operation;
identifying a second remote manipulation device associated with the second operator; and
establishing a second communicative connection between the second remote manipulation device and the at least one robotic unit, the second communicative connection enabling movement of the at least one robotic unit to be executed by the second operator in accordance with a second motion provided with the second remote manipulation device.

8. The computer-implemented method of claim 6, further comprising receiving instructions from the remote manipulation device to perform an item retrieval operation.

9. The computer-implemented method of claim 6, wherein the step of establishing the communicative connection between the remote manipulation device and the at least one robotic unit comprises relaying image information received from the at least one robotic unit to the remote manipulation device and relaying commands received from the remote manipulation device to the at least one robotic unit.

10. The computer-implemented method of claim 6, further comprising the step of augmenting the image information with a highlight of an object to be manipulated in relation to the manual operation.

11. The computer-implemented method of claim 6, wherein identifying the remote manipulation device comprises identifying a combination of remote manipulation devices, and wherein establishing the communicative connection comprises establishing communicative connections between the combination of remote manipulation devices and the at least one robotic unit.

12. The computer-implemented method of claim 11, wherein identifying comprises identifying the remote manipulation device as comprising a virtual reality (VR) headset and a pair of sensor gloves.

13. The computer-implemented method of claim 11, wherein identifying the remote manipulation device comprises identifying the remote manipulation device as comprising a display device and at least one of a joystick or a motion-tracking-camera based sensor.

14. An inventory management system, comprising:
at least one robotic unit;
a remote manipulation device;
a processor; and
a memory including computer-executable instructions that, when executed with the processor, cause the at least one robotic unit to, at least:
receive, from the at least one robotic unit, a request for manual completion of a task, the request for manual completion of the task received during automated execution of a set of instructions by the at least one robotic unit responsive to a determination being made that the task is unable to be completed in an automated manner;
submit the request for manual completion of the task into a request queue;
upon determining that the request has reached the top of the request queue, establish a communicative connection between the remote manipulation device and the at least one robotic unit, the communicative connection enabling movement of the at least one robotic unit to be executed in accordance with a motion provided with the remote manipulation device;
record operations performed by the operator while controlling the at least one robotic unit;
determine a subsequent task of a plurality of tasks for a robotic unit of a plurality of robotic units; and
determine instructions for automated execution of the task by the at least one robotic unit, wherein the instructions are determined based at least in part on a pattern identified from one or more operations historical tasks performed by one or more respective operators, the pattern being identified based at least in part on a machine learning technique.

15. The inventory management system of claim 14, wherein the at least one robotic unit comprises a robotic picking unit having a detachable EOAT.

16. The inventory management system of claim 14, wherein the at least one robotic unit comprises a special-purpose robotic picking unit having a non-detachable EOAT.

17. The inventory management system of claim 14, wherein the computer-executable instructions, when executed with the processor, are further configured to cause a robotic arm assembly to provide a set of instructions to the at least one robotic unit to cause the at least one robotic unit to perform a series of operations, wherein the request for manual completion of the task comprises a request for completion of at least one operation in the series of operations.

18. The inventory management system of claim 17, wherein the computer-executable instructions, when executed with the processor, are further configured to provide the set of instructions to the at least one robotic unit based on one or more capabilities of the at least one robotic unit.

19. The inventory management system of claim 17, wherein at least a portion of the series of operations comprises operations to be performed automatically by the at least one robotic unit.

20. The inventory management system of claim 19, wherein the set of instructions causes the at least one robotic unit to continue performing the portion of the series of operations automatically upon completion of the task.

* * * * *